Patented June 17, 1941

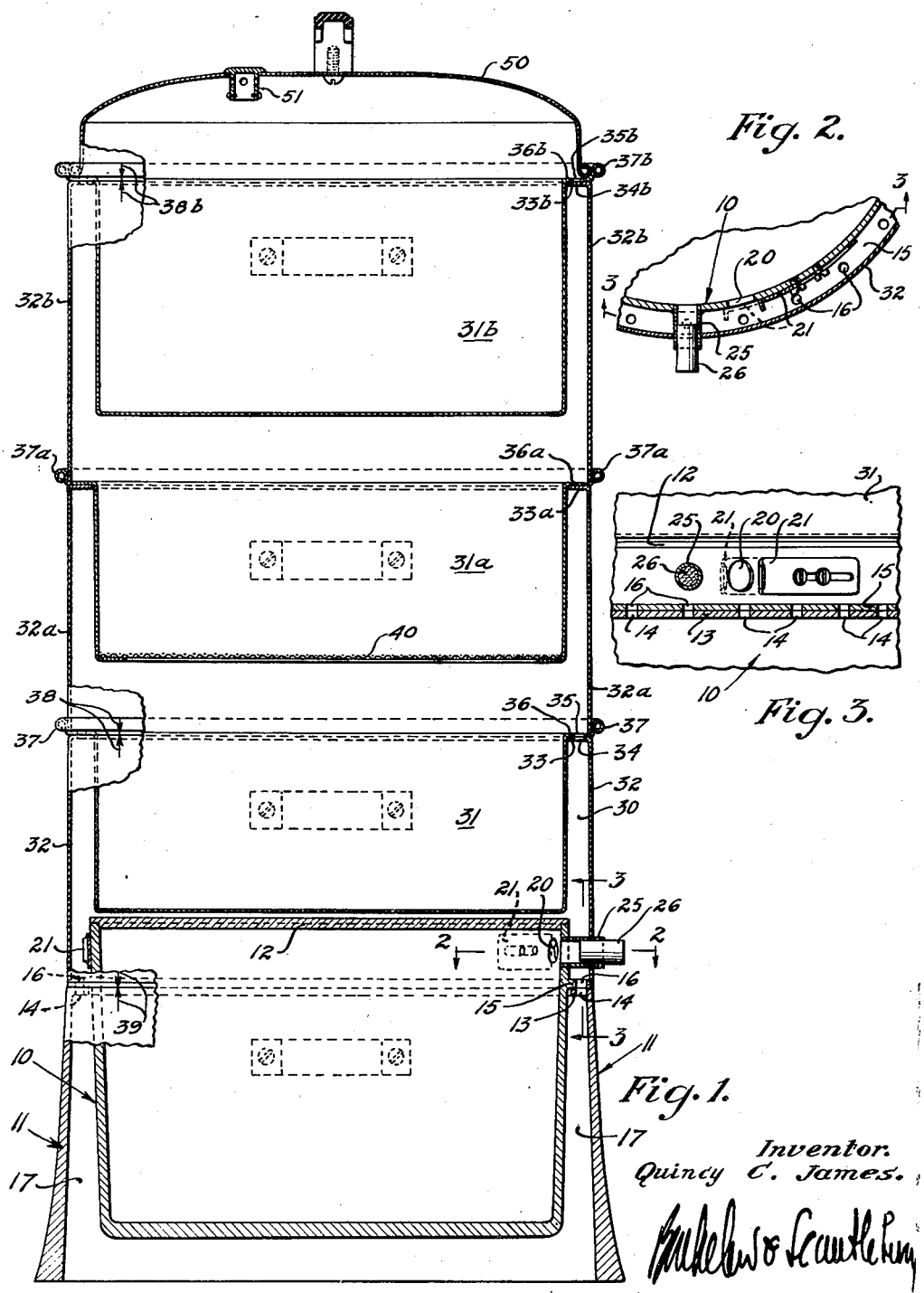

2,246,048

UNITED STATES PATENT OFFICE 2,246,048

COOKER

Quincy C. James, Pasadena, Calif., assignor of one-fourth to James T. Barkelew and one-fourth to John R. Pratt, both of Pasadena, Calif.

Application February 24, 1940, Serial No. 320,623

4 Claims. (Cl. 53—2)

This invention relates to cooking utensils, and the general object is the provision of a multiple unit cooking utensil which conserves heat and which also provides means for applying different kinds and degrees of heat to the food stuffs being cooked. It is also a general object of the invention to provide a combination in which any number of different food stuffs may be separately but simultaneously cooked, with controlled application of different degrees of either steam heat or dry heat, utilizing only the same total amount of heat as is usually wastefully utilized in the cooking of one pot of food stuff.

My invention accomplishes these and other objects by providing a stack of pots which are interchangeable and are capable of being arranged in any desired sequence. The lowermost one of the pots is preferably a pot for containing water and in which cooking may or may not be done as desired. This lowermost water containing pot is spacedly supported within a heat jacket over the source of heat, as for instance a gas flame or an electric heating element. Provision is made in this lowermost pot so that the hot gases from the source of heat may either be passed upwardly through the jacket around the pot, or hot steam may be released from the pot, or both. Above this lowermost pot are one or more superposed pots. Typically, each of these superposed pots has a surrounding heat jacket which, registering with the heat jacket below, may be arranged to pass the heat upwardly from below or to shut it off to any desired extent. The arrangement is such that by proper manipulation of the parts, either dry heat or steam heat may be passed upwardly around the several superposed pots to any desired extent. And the arrangement is also such that the superposed pots may all be substantial duplicates of each other.

The invention, its objects and accomplishments, will be best understood from the following detailed description of a preferred and illustrative form, reference being had to the accompanying drawing in which—

Fig. 1 is a vertical central section of a typical and illustrative construction and arrangement, fragmentary parts being shown in elevation for purposes of illustration;

Fig. 2 is a sectional detail taken on line 2—2 of Fig. 1;

Fig. 3 is a sectional detail taken on lines 3—3 of Figs. 1 and 2.

In the drawing the lowermost water containing pot is shown at 10 and its surrounding and supporting heat jacket is shown at 11. Pot 10 has a cover 12. And preferably the pot 10, jacket 11 and cover 12 are made of fairly heavy metal so that they, as well as the water contained in pot 10, will have some considerable heat holding capacity.

The upper edge of heat jacket 11 has an inturned flange 13 with a circular series of perforations 14. The pot 10 has an external flange 15 with a registering series of perforations 16. These flanges provide the means for supporting pot 10 in jacket 11, and the perforations 14 and 16 provide means for either opening a passage for hot gases upwardly through and out of the heat jacket space 17, or for closing off that passage, as may be desired. Simple rotation of pot 10 in the heat jacket puts the perforations into or out of register to any extent desired.

A suitable means is provided for controlling the discharge of hot steam from the upper part of pot 10 above the flange 15. As shown here, the upper wall of the pot is provided with one or more steam discharge ports 20 controlled by simple slide shutters 21. By opening ports 20 steam may be discharged from the upper part of pot 10 into the heat jacket space 30 of the pot immediately above the lowermost pot. By closing off port 20 steam discharge may be shut off; and to relieve steam pressure the pot 10 has a steam outlet nipple 25 which may be controlled by any suitable valvular means. Although other valvular means may be used, the nipple is here shown as being closed, when desired, with a simple plug 26.

Use of cover 12 on lower pot 10 is optional. If pot 10 is used without the cover then steam may escape directly to the pots above. This may be desirable when one wishes to cook by steam heat alone in all the pots above.

Above the lowermost pot structure the next pot structure of the stack comprises a pot 31 and a heat jacket 32. The lower edge of heat jacket 32 rests upon the periphery of flange 15 of lowermost pot 10. The upper edge of heat jacket 32 has an inturned flange 33 with a circular series of perforations 34 adapted to be registered to any desired extent with the circular series of perforations 35 in the upper out-turned flange 36 of pot 31. This upper out-turned flange 36 of pot 31 has at its outer edge an upstanding bead 37 within which the lower edge of the next heat jacket 32a is received.

Registration marks, such as shown at 38, on bead 37 and on heat jacket 32, provide means for indicating when the perforations 34 and 35 are in full register. It may also be noted that registration marks such as shown at 39 in Fig. 1 provide a similar indicator for the registration of the perforations 14 and 16 of the lowermost pot structure. One of the registration marks 39 is placed on the lower part or lower edge of the heat jacket 32 which is rotatively locked to the lowermost pot 10 because the steam discharge nipple 25 from pot 10 projects through an opening in jacket 32.

The remaining pot structures of the stack may be in any desired number and are essentially duplicates of the pot structure 31, 32, except for certain details and except for the fact that the several pots may be made of various sizes. Thus, the pot structure here shown superposed directly on the pot structure 31, 32, has a heat jacket 32a which is essentially the same as the heat jacket 32, and has a pot 31a which is essentially the same as the pot 31; except that in this case the flange perforations 34 and 35 may be omitted, and pot 31a is provided with a perforate bottom 40. The heat jacket 32a has at its upper end the standard inturned flange 33a and the upper edge of pot 31a has the standard external flange 36a with the bead 37a.

Above the pot structure 31a, 32a, I show another pot structure 31b, 32b, which, as shown in the illustrative drawing, is a duplicate in all detail of the pot structure 31, 32, except for size. Numerals are applied to the different parts of this uppermost pot structure, similar to the numerals applied to the pot structure 31, 32, but with the suffix b applied.

The whole stack of pots may consist of any suitable number of individual pot structures such as are here shown, and the various pots may be of any suitable variations in size, and may have either imperforate or perforated bottoms, as described. The sequence of arrangement in the vertical stack may also be as desired. For instance, for many purposes it may be desired to place the perforate pot 31a at the top of the stack.

At the top of the stack of pots the hot gases or hot steam may either escape directly to atmosphere through the perforations 34b, 35b, or the hot gases or steam may be discharged under a cover 50 which rests on the flange 36b and fits inside the bead 37b. From under the cover the hot gases or steam may escape to atmosphere either by lifting the cover or through a valve of any suitable type and kind as desired. For instance I here show a simple valve 51 of the type that will retain any desired amount of pressure and open for discharge when that pressure is reached.

In using the stack of pots different food stuffs are placed in the several pots and then the pots are arranged in the stack in any desired order. And, in the various pots, food may be placed for cooking either in any desired liquid or substantially dry. And in the pot 31a food stuffs may be placed which are either to be steamed or to be cooked by contact with dry heated gases. The preparation of the food and the relative arrangement of the pots containing the food are quite entirely within the decision and control of the cook. Having made the desired arrangement, then it is possible to apply to the various pots either steam heat or dry heat. For instance, by proper manipulation of the registering perforations and of the steam outlet from lowermost pot 10, the cook may pass dry hot gases directly from the source of heat upwardly through all of the superposed heat jacket spaces and under all the pots. Or steam from the lowermost pot may be exclusively passed up through the heat jacket spaces, or both steam and dry hot gases. Or, dry heat may be applied to a lower pot or pots, and steam heat to an upper pot or pots. For instance the lower perforations 14, 16, may be open to pass the dry hot gases from the source of heat up under the lower pot 31 and into the heat jacket space 30 surrounding it. The perforations 34, 35, of pot 31, may be closed, so that the dry hot gases rise no further. The food in pot 31 will ordinarily be cooked without water. Any vapors from that pot then rise out of pot 31 and either pass upwardly through the perforate pot 31a, if that is being used, or rise upwardly under pot 31b and through the heat jacket space 30b surrounding it. By such and other suitable arrangements and dispositions of the various parts, dry heat may be applied to certain selected ones of the pots in the stack while steam heat may be applied to others.

With my stack of pots, I have found that a great variety of food stuffs, enough to constitute a complete meal or more, may be cooked to complete satisfaction at one time. And the conservation of heat is such that the cooking of food stuffs constituting a complete meal requires only the amount of heat that is thrown off by the usual single burner—requires only the same amount of heat which is commonly wastefully used in cooking the food stuffs contained in a single pot.

I claim:

1. In cooking utensils, the combination of a plurality of substantially duplicate pot structures, one resting on another, each said structure comprising an exterior heat jacket open at both top and bottom and adapted to be supported at its lower edge and having an inturned perforated flange at its upper edge, and an interior pot annularly spaced within the heat jacket and having at its upper part an out-turned perforated flange resting on the flange of the heat jacket, the perforations of the two flanges adapted to register, the pot flange being adapted to support the lower edge of the heat jacket next above it and being manually engageable externally of the heat jackets for rotation relative to its corresponding heat jacket flange to adjust the registration of the flange perforations.

2. In cooking utensils, the combination of a plurality of substantially duplicate pot structures, one resting on another, each said structure comprising an exterior heat jacket open at both top and bottom and adapted to be supported at its lower edge and having an inturned perforated flange at its upper edge, and an interior pot annularly spaced within the heat jacket and having at its upper part an out-turned perforated flange resting on the flange of the heat jacket, the perforations of the two flanges adapted to register, the pot flange being adapted to support the lower edge of the heat jacket next above it and being manually engageable externally of the heat jackets for rotation relative to its corresponding heat jacket flange to adjust the registration of the flange perforations; the lowermost one of said pots having a cover and a steam outlet port near its top above its perforated flange, and valvular means for controlling said port; and the lowermost heat jacket being open at its bottom to take heated gases from the heating source over which the utensil is placed.

3. In cooking utensils, the combination of a plurality of substantially duplicate pot structures, one resting on another, each said structure comprising an exterior heat jacket annular in form, open at both top and bottom, and having upper and lower edges, an inturned perforated flange at one of the edges of the jacket, and an interior pot annularly spaced within the heat jacket and having a circumferential out-turned perforated flange adapted to supportingly engage the inturned jacket flange in such manner that the perforations of the two engaging flanges are adapted to register, the lower edge of each heat jacket except the lowermost being supported on the flange of the pot next below it, and each pot flange projecting externally of the adjacent heat jackets so as to be manually engageable for rotation relative to its corresponding heat jacket flange to adjust the registration of the flange perforations.

4. In cooking utensils, the combination of a plurality of substantially duplicate pot structures, one resting on another, each said structure comprising an exterior heat jacket annular in form, open at both top and bottom, and having upper and lower edges, an inturned perforated flange at one of the edges of the jacket, and an interior pot annularly spaced within the heat jacket and having a circumferential out-turned perforated flange adapted to supportingly engage the inturned jacket flange in such manner that the perforations of the two engaging flanges are adapted to register, the lower edge of each heat jacket except the lowermost being supported on the flange of the pot next below it, and each pot flange projecting externally of the adjacent heat jackets so as to be manually engageable for rotation relative to its corresponding heat jacket flange to adjust the registration of the flange perforations; the lowermost one of the pots having a cover and a controllable steam outlet port near its top above its perforated flange, and the open lower end of the lowermost heat jacket being adapted to take heated gases from the heating source over which the utensil is placed.

QUINCY C. JAMES.